Sept. 22, 1931.    K. W. ABENDROTH    1,824,108
TRACK INSTRUMENT
Filed Nov. 1, 1930
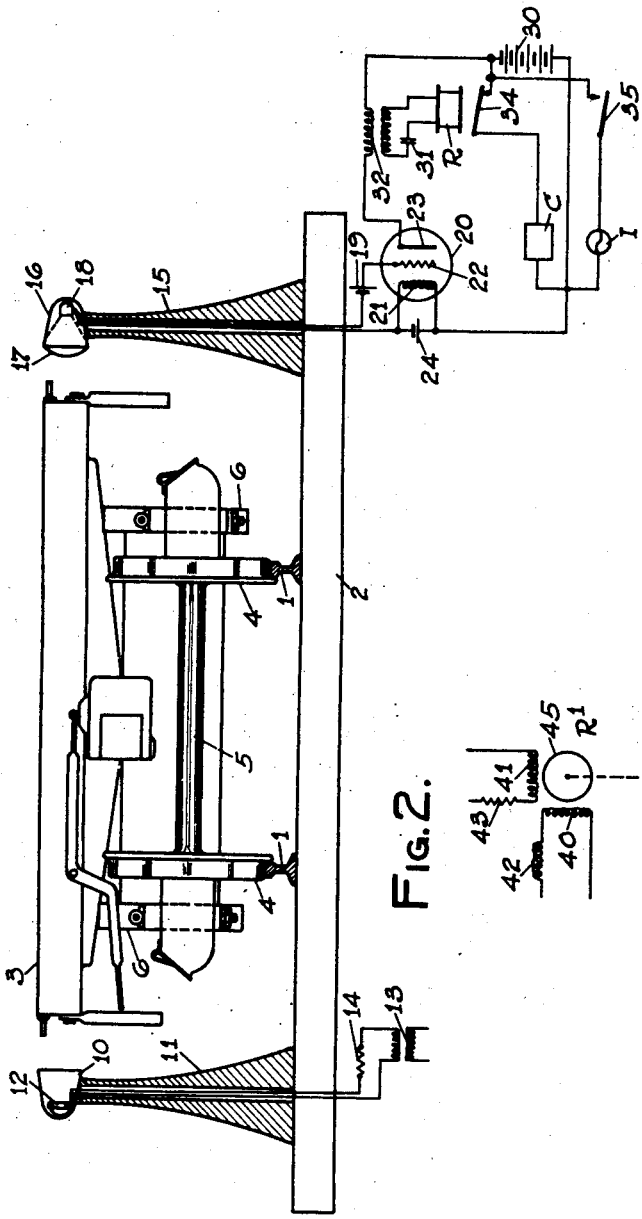
INVENTOR
K. W. Abendroth,
BY Neil D. Preston,
his ATTORNEY Patented Sept. 22, 1931

1,824,108

UNITED STATES PATENT OFFICE

KARL W. ABENDROTH, OF ROCHESTER, NEW YORK, ASSIGNOR TO GENERAL RAILWAY SIGNAL COMPANY, OF ROCHESTER, NEW YORK

TRACK INSTRUMENT

Application filed November 1, 1930. Serial No. 492,778.

This invention relates to "track instruments" and more particularly to a track instrument in which the presence of a train is detected optically.

In accordance with the present invention it is proposed to indicate automatically the presence of a train or car, at a particular point on a particular track optically and automatically. That is, it is proposed to use a photo-electric cell for manifesting the presence of such car or train. In accordance with the preferred form of the invention it is proposed to locate a source of light and a photo-electric cell so that the light source will project a concentrated beam into the photo-electric cell, and further so that the position of a train will intercept such beam of light. A further feature of the present invention resides in the provision of a source of light in the above mentioned arrangement, which source of light varies in intensity substantially in accordance with the instantaneous current flow, so that irrespective of the frequency of the current applied to the lamp the light emitted will have a very sharply defined corresponding frequency. More specifically, the source of light contemplated is a light of the neon gas arc type, in which neon gas is contained in an evacuated tube containing electrodes, so that the light intensity varies in magnitude with the magnitude of the current flow, this because the neon gas cannot store any appreciable amount of heat, so that the illumination does not lag behind the current producing it.

Other objects, purposes and characteristic features of the invention will in part be pointed out hereinafter and will in part be apparent from the accompanying drawings.

In describing the invention in detail reference will be made to the accompanying drawings, in which:—

Fig. 1 shows one embodiment of the invention; and

Fig. 2 shows a modified form of relay usable in the system shown in Fig. 1 of the drawings.

Referring to the drawings the invention has been shown applied to a railway track having rails 1 supported on ties 2, upon which track has been shown a flat car 3, having wheels 4, contained on axles 5 mounted in side frames 6.

As shown, there is provided on one side of the track a suitable light concentrating device such as a lens or reflector 10, supported on a pedestal 11 and containing a suitable electric lamp constantly energized from an alternating current source, such as the transformer 13, through a circuit including the resistance 14. The resistance 14 is used to limit the flow of current after the arc is started. This lamp 12 is preferably one of the neon gas arc type, which for reasons above mentioned, emits light of an intensity corresponding to the current passing therethrough. On the opposite side of the track, and also supported on the ties through the medium of a pedestal 15, is a casing 16 having a suitable light concentrating device such as the lens 17 and a photo-electric cell 18. This photo-electric cell 18 is connected in a circuit with a battery 19, which battery 19 may be contained within the cell unit 18, if desired, this branch circuit being connected between the filament 21 and the grid 22 of an amplifier 20. The filament 21 is preferably heated by a suitable current source, such as the battery 24. It thus appears that the potential applied to the grid 22 is proportional to the light received by the photo-electric cell 18, and that this grid potential is of the same frequency as that applied to the transformer 13, this grid potential of course affecting the electro discharge from the filament 21.

A relay R is preferably included in the plate circuit containing the plate 23 of the amplifier 20, which plate circuit also preferably includes a plate battery 30. The relay R may be either a relay of the tractive type shown in Fig. 1 or may be a relay of poly-phase induction type shown in Fig. 2. If a poly-phase induction type relay is employed, such as shown in Fig. 2, no filter or tuning device is required. In this case, one of the windings 40 of the relay R¹ will be included in the plate circuit just mentioned, whereas the other winding 41 is connected to the same source which feeds the transformer 13, the winding 40 preferably including an inductance 42, whereas the winding preferably includes a resistance 43, this inductance 42 and the resistance 43 being provided to obtain the necessary phase displacement of currents flowing in the windings 40 and 41 to produce a torque in the rotor 45.

If the relay R is a relay of the tractive type, as shown in Fig. 1, it preferably has included in series therewith a filter, tuned for current resonance for the frequency of the alternating current applied to the transformer 13, and this filter preferably comprises a condenser 31 connected in series with the relay R, which condenser has a capacity to resonate the plate circuit to the frequency applied to the transformer 13; a transformer 32 will of course be necessary to allow the flow of direct current in the plate circuit in spite of the condenser 31 included in series with the relay R.

From the foregoing it is apparent that the relay R would not respond to light penetrating the photo-electric cell 18 from a foreign source, such as sunlight or other similar sources of light, but will respond only in the event that a light source of the proper frequency directs its light into the photo-electric cell 18, insofar as the arrangement shown in Fig. 1 is concerned, and with respect to Fig. 2 the light source must not only have the proper frequency, but must also have the proper phase relation with respect to the alternating current applied to the local winding 41 of the relay R¹.

As illustrated in Fig. 1 of the drawings the light source 12 and the photo-electric cell 18 have been shown at the level of the floor of a flat car, so that the track instrument of the present invention may not only be used to manifest the presence of a train, but may be used for counting the number of cars in the train, this on the assumption that the coupling between cars is located at a level not to intercept the light passing from the source 12 to the photo-electric cell 18. Such a counter has been shown at C, which counter C registers or counts one unit for each energization of its associated electro-magnet. This counter has been shown connected in series with the plate battery 30 and a back contact 34 of the relay R.

On the other hand, if desired, this light source 12 and photo-electric cell 18 may be placed just above the edge of the rails, so that the relay R may be used for counting the wheels of the train, rather than the cars of the train. Further, if it were desired to count the number of trains only the path of the light passing from the source 12 to the photo-electric cell 18 may pass across the track rails 1 at the elevation shown in Fig. 1 and at an actue angle, so that any part of an entire train will intercept the light, so that there will be only one interception of the light during the passage of the entire train, irrespective of the number of cars in such train.

The photo-electric cell 18 together with the battery 19 may be of any suitable construction, so long as the potential applied to the grid 22 either increases or decreases in accordance with the intensity of the light impinging upon this photo-electric cell. For instance, this cell may comprise a resistance element of selenium, wherein the resistance varies in accordance with the intensity of the light striking this selenium.

*Operation.*—Referring to Fig. 1, under normal conditions, that is when there is no train to obstruct the flow from the light source 12 to the selenium cell or other type of photo-electric cell 18, the relay R will be energized, this because the pulsating light beam passing from the source 12 to the cell 18 will produce voltage impulses on the grid 22 of the same frequency as the impulses of the light beam. These voltage impulses impressed upon the grid 22 will cause a pulsating current in the plate circuit from the battery 30 through the primary winding of the transformer 32, through the gap passing from the plate 23 to the filament 21, and then back to the negative terminal of the battery 30. If now, a car moving on the track rails 1 passes across the line of the light path, this light beam will be entirely cut off insofar as its striking the photo-electric cell 18 is concerned, so that any potential that may be acting on the grid 22 due to sunlight, or similar foreign light sources, will be uni-directional and of constant value, and will cause only a direct current to flow through the primary winding of the transformer 32, thereby allowing de-energization of the relay R, and thereby causing the back contact 34 of the relay R to close and causing the counter C to register an additional unit on its counting dial. As soon as the car in question moves out of the path of the light beam, pulsating voltage of the proper frequency will again be applied to the grid 22, thereby causing a pulsating current to flow in the primary winding of the transformer 32 included in the plate circuit of the amplifier 20, which in turn produces an alternating current electro-motive force in the secondary winding of this transformer 32 which alternating current voltage is of the proper frequency to freely flow through the tuned unit comprising the inductance of the relay R and the condenser 31 connected in series, to cause the relay R to pick up its contacts 34 and 35 to open the circuit including the counter C and closing the circuit including the indicator I. It is of course understood that the optical track instrument of the present invention including the relay R may be used in many different ways in the railway signaling, interlocking, and train control field, as well understood by those skilled in the art.

Having thus shown and described two rather specific embodiments of the present invention, it is desired to be understood that the specific embodiments of the invention illustrated have not been selected for the purpose of showing the scope of the invention nor the exact construction preferably employed in practicing the invention, but have been selected to facilitate description of the invention, and that various changes, modifications and additions may be made to adapt the invention to the particular problem encountered in practicing the same, all without departing from the spirit or scope of the invention or the idea of means underlying the same, except as demanded by the scope of the following claims.

What I claim is:—

1. Apparatus for detecting the passage of a railway vehicle comprising; a light source for directing a beam of light across the path of such vehicle and including a sealed glass tube containing a suitable conducting gas, means for passing alternating current of a specific frequency through said gas to produce a pulsating light beam of a corresponding frequency, and light responsive means responsive only to a pulsating light beam of said frequency located on the other side of the path of movement of said vehicle, whereby the passage of such vehicle can be detected irrespective of the presence of foreign light sources.

2. Apparatus for detecting the passage of a railway vehicle comprising; a light source for directing a beam of light across the path of such vehicle and including a sealed glass tube containing a suitable conducting gas, means for passing alternating current of a specific frequency through said gas to produce a pulsating light beam of a corresponding frequency, light responsive means responsive only to a pulsating light beam of said frequency located on the other side of the path of movement of said vehicle, and indicating means operated by said light responsive means, whereby the passage of such vehicle can be detected irrespective of the presence of foreign light sources.

3. Apparatus for detecting the passage of a railway vehicle comprising; a light source for directing a beam of light across the path of such vehicle and including a sealed glass tube containing a suitable conducting gas, means for passing alternating current of a specific frequency through said gas to produce a pulsating light beam of a corresponding frequency, light responsive means responsive only to a pulsating light beam of said frequency located on the other side of the path of movement of said vehicle, and recording means operated by said light responsive means, whereby the passage of such vehicle can be detected irrespective of the presence of foreign light sources.

4. Apparatus for detecting the passage of a moving element on a railway track comprising; a light source for directing a beam of light so as to be intercepted by said moving element and including a sealed glass tube containing a suitable conducting gas, means for passing alternating current of a specific frequency through said gas to produce a pulsating light beam of a corresponding frequency, and light responsive means responsive only to a pulsating light beam of said frequency located in said beam and beyond said moving body, whereby the passage of said body can be detected irrespective of the presence of foreign light sources.

In testimony whereof I affix my signature.

KARL W. ABENDROTH.